(No Model.)
L. J. RICE.
HOSE COUPLING.
No. 458,038.  Patented Aug. 18, 1891.
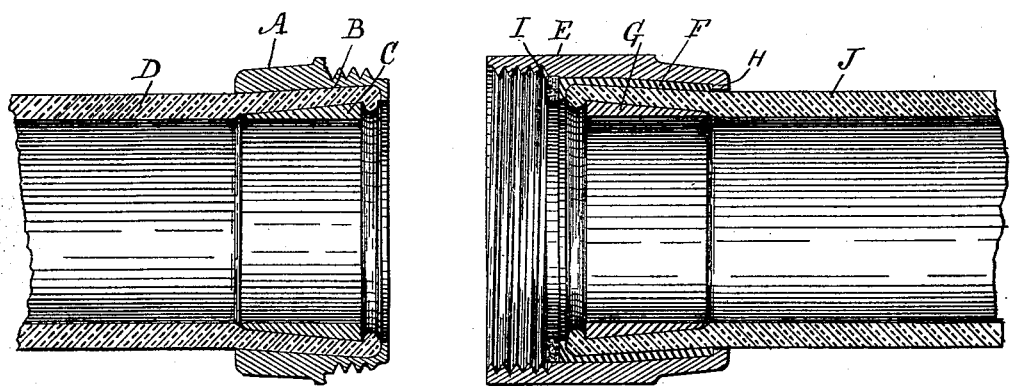
WITNESSES:
V. M. Hood.
B. R. Shover.
INVENTOR:
Lewis J. Rice
BY H. P. Hood.
ATTORNEY.

UNITED STATES PATENT OFFICE.

LEWIS J. RICE, OF INDIANAPOLIS, INDIANA.

HOSE-COUPLING.

SPECIFICATION forming part of Letters Patent No. 458,038, dated August 18, 1891.

Application filed February 20, 1891. Serial No. 382,185. (No model.)

*To all whom it may concern:*

Be it known that I, LEWIS J. RICE, a citizen of the United States, residing at Indianapolis, in the county of Marion and State of Indiana, have invented a new and useful Improvement in Hose-Couplings, of which the following is a specification.

My invention relates to an improvement in that class of hose-couplings in which the hose is secured to the coupling by means of a tapering thimble fitting inside of the end of the hose and expanding it into a corresponding recess in the coupling. In this class of couplings as heretofore constructed the tapered thimble has been usually inserted in the hose in a straight cylindrical form and afterward expanded at one end by means of a suitable tool, so as to form an annular tubular wedge, but in some cases the tubular wedge has been first formed, by casting or otherwise, and then driven into the open end of the hose. In either case, however, the angle of inclination of the exterior surface to the axis of the tubular wedge has been the same as the angle of inclination of the interior of the socket or recess in the coupling. It has been found in practice that in such construction the tubular wedge, having nothing to hold it in place except the friction of its exterior surface on the hose, is easily displaced in handling the hose.

The object of my improvement is therefore to prevent in this class of couplings the working loose of the tubular wedge and to mount the same in both members of a screw-threaded coupling, so that said members may be screwed together without turning the hose, all as hereinafter fully set forth.

The accompanying drawing illustrates my invention.

The figure represents a central longitudinal section of the male and female members of a hose-coupling, each attached to a section of hose.

A is the male member of the coupling, having the interior tapered recess B, arranged with its larger end toward the outer end of the coupling.

C is a tubular wedge of smaller exterior diameter than the interior of coupling A and having its exterior surface inclined to its axis at a more obtuse angle than the interior of coupling A in recess B.

D is a section of hose.

In securing the hose to coupling A its end is inserted at the smaller end of recess B and pushed forward the length of the recess. The tubular wedge C is then passed through the outer end of coupling A and driven into the open end of the hose until its wider end has passed below the end of the hose, which expands inward and prevents the return of the wedge. In this position the thick end of the wedge is embedded in the interior surface of the hose, and the pressure of the wedge upon the hose is greatest at its widest end.

Heretofore when the taper of the tubular wedge has been made to correspond to the taper of the recess in the coupling the pressure of the wedge upon the hose has been equally distributed along the entire length of the wedge, and the result has been that when the hose was bent near the coupling the pressure would be greatest on the point of the wedge at one side thereof, and the wedge would be forced outward through the end of the coupling if not held in place by a flange on the end of the coupling, in which case the wedge had to be inserted in the form of a straight cylinder and afterward expanded at one end. By my construction both of these difficulties are avoided, and it is impossible to work the wedge out of position by the bending of the hose.

For the purpose of securing the hose J to the other or female member of the coupling in such a manner that the coupling may turn upon the hose in screwing its parts together, the hose is secured to a tapered sleeve F, having an interior recess similar to that in coupling A, by means of a tubular wedge G, similar in all respects to the wedge C, before described. Sleeve F is then mounted in coupling E, with its rear end resting against the inwardly-projecting flange H, formed on coupling E.

In screwing the parts of the coupling together a gasket I is placed between the coupling A and sleeve F, and the coupling E turns on sleeve F.

I claim as my invention—

1. The combination, with a hose and a member of a hose-coupling having an interior tapered recess arranged with its larger end toward the outer end of the coupling member, of a tubular wedge whose exterior surface is inclined to its axis at a more obtuse angle than the walls of said recess, whereby when the hose is inserted in the coupling member and the tubular member is driven into the hose beyond the end thereof the hose is clamped against the walls of the recess with a greater pressure at the wider end of the wedge than at its point and the wedge is retained in its position by the end of the hose, substantially as set forth.

2. In a hose-coupling, the combination of the male coupling member having the interior tapering recess arranged with its larger end toward the outer end of the coupling member, the hose-section, the tubular wedge having its exterior surface inclined to its axis at a more obtuse angle than the walls of said recess, the female coupling member, the sleeve mounted in said coupling member and having the interior tapered recess, the tubular wedge having its exterior surface inclined to its axis at a more obtuse angle than the walls of said recess, and the hose-section secured thereby, all arranged to co-operate in the manner set forth.

LEWIS J. RICE.

Witnesses:
 H. P. HOOD,
 V. M. HOOD.